(12) United States Patent
Smith et al.

(10) Patent No.: US 6,405,635 B1
(45) Date of Patent: Jun. 18, 2002

(54) BRAKE ACTUATOR

(75) Inventors: Teddy D. Smith; Greg Smith, both of Fresno, CA (US); Ralph D. Russell, Yuma, AZ (US); Michael D. Stubblefield, Fresno, CA (US)

(73) Assignee: TSE Brakes, Inc., Fresno, CA (US)

( * ) Notice: Subject to any disclaimer, the term of this patent is extended or adjusted under 35 U.S.C. 154(b) by 26 days.

(21) Appl. No.: 09/690,789

(22) Filed: Oct. 16, 2000

Related U.S. Application Data (63) Continuation-in-part of application No. 09/087,429, filed on May 29, 1998, now Pat. No. 6,131,501, which is a continuation of application No. 08/662,993, filed on Jun. 13, 1996, now Pat. No. 5,758,564.

(51) Int. Cl.[7] .................................................. F16J 3/02
(52) U.S. Cl. ....................................................... 92/98 R
(58) Field of Search ......................... 92/63, 98 R, 98 D (56) References Cited

U.S. PATENT DOCUMENTS

| | | | |
|---|---|---|---|
| 2,541,205 A | 2/1951 | Christophersen | |
| 3,101,133 A | 8/1963 | House et al. | |
| 3,630,093 A | * 12/1971 | Morse et al. ................ | 92/63 X |
| 3,696,711 A | 10/1972 | Berg et al. | |
| 3,926,094 A | 12/1975 | Kurichh et al. | |
| 4,850,263 A | 7/1989 | Rumsey et al. | |
| 4,960,036 A | 10/1990 | Gummer et al. | |
| 5,062,455 A | * 11/1991 | Schurter et al. ......... | 92/98 R X |
| 5,067,391 A | 11/1991 | Choinski et al. | |
| 5,193,432 A | 3/1993 | Smith | |
| 5,205,205 A | 4/1993 | Choinski et al. | |
| 5,285,716 A | 2/1994 | Thompson ............... | 92/98 R X |
| 5,315,918 A | 5/1994 | Pierce | |
| 5,353,688 A | 10/1994 | Pierce et al. ............ | 92/98 R X |
| 5,676,036 A | * 10/1997 | Choinski .................... | 92/63 X |
| 5,758,564 A | * 6/1998 | Smith et al. ................. | 92/98 R |
| 5,771,774 A | 6/1998 | Stojic | |
| 6,012,378 A | 1/2000 | Hicks | |
| 6,129,004 A | * 10/2000 | Smith et al. ................. | 92/98 R |
| 6,223,647 B1 | * 5/2001 | Plantan et al. ................. | 92/63 |

FOREIGN PATENT DOCUMENTS

GB 028074 1/1979

* cited by examiner

*Primary Examiner*—John E. Ryznic
(74) *Attorney, Agent, or Firm*—Mark D. Miller (57) ABSTRACT

The present invention is an improved secure coupling for vehicle brake actuator units that allows for a stronger and more efficient units having the same or smaller overall profile. The coupling is used between the housing cup of either a service brake actuator or an emergency brake actuator, or both, and a corresponding adaptor where the housing cup(s) and adaptor are made of dissimilar metals. In the coupling, the cylindrical wall of the housing cup is substantially vertical, and the corresponding annular edges of the adaptor cup are provided with a uniquely shaped engagement structure. This structure allows the edges of the elastomeric diaphragm deployed in the actuator to extend away from the coupling at a substantially vertical angle, making available more surface area of the diaphragm to press against a pressure-transmitting plate inside. This allows the brake actuator unit to transmit more force, and/or to employ a stronger emergency brake spring, without increasing the size of the unit.

20 Claims, 4 Drawing Sheets

BRAKE ACTUATOR

This application is a continuation-in-part of application Ser. No. 09/087,429 filed on May 29, 1998, (to be issued on Oct. 17, 2000 as U.S. Pat. No. 6,131,501) which was a continuation of application Ser. No. 08/662,993 filed on Jun. 13, 1996, now U.S. Pat. No. 5,758,564.

BACKGROUND OF THE INVENTION

1. Field of the Invention

The present invention relates to spring brake actuators used on heavy duty commercial vehicles, and more particularly to an apparatus for attaching either an emergency brake housing cup, a service brake housing cup, or both, of a spring brake actuator to an adaptor made of the same or a dissimilar metal.

2. Description of the Prior Art

Various forms of pneumatic vehicle spring brake actuators have been introduced over the years primarily for use in the trucking industry. A typical actuator includes a service brake assembly that is used for slowing or stopping a vehicle, and may also include an emergency or parking brake assembly.

The service brake assembly is characterized by a closed housing which contains an elastomeric diaphragm sealingly attached to the sides of the housing, dividing the housing into two chambers. A first chamber is defined on one side of the diaphragm. A centrally located slidable push rod is provided in the first chamber and is operably associated with the diaphragm. The rod extends out of the service brake housing for attachment to the braking mechanism of the vehicle. A second sealed chamber is formed within the housing on the opposite side of the diaphragm. An opening is provided in the second chamber for connection to a pneumatic (air) pressure source usually provided by an on-board air compressor. The brakes of the vehicle can be applied by variably introducing sufficient pneumatic pressure into the sealed chamber to act against the diaphragm to move the push rod out. A small return spring is provided inside the service brake housing around the push rod to urge it to retract when the air pressure behind the diaphragm is reduced.

When employed, the emergency brake assembly is attached in axial alignment with the service brake assembly. The emergency brake is a separate closed housing which also contains a diaphragm sealingly attached to the sides of the housing dividing the housing into two chambers. A heavy compression spring is provided in the first chamber, and a slidable central rod is provided in the second sealed chamber for communication with the push rod of the service brake assembly. As with the service brake, the sealed chamber of the emergency brake is connected to the on-board pressurized air source of the vehicle. As long as sufficient air pressure is provided, the diaphragm in the emergency brake housing holds off the large compression spring. However, should pressure fall, or should there be a leak in the sealed chamber, the diaphragm will be unable to hold the large compression spring in place. When this occurs, either slowly or quickly, the large compression spring expands, causing the central rod to move the push rod out thereby applying the brakes of the vehicle. Under normal conditions, when the vehicle is parked, the air pressure to the emergency brake portion is cut off causing the large compression spring to apply the brakes.

Because the spring brake assembly is a critical safety system, it has to be designed and manufactured for exceptional reliability. Moreover, the compression spring inside the emergency brake actuator can be potentially dangerous. It must be capable of exerting a sufficient force to apply the brakes of the vehicle independent of any external air pressure or assistance from the service brake. This spring in its compressed state stores substantial kinetic energy which may be dangerous if the spring brake housing is opened without first taking adequate precautions to secure the spring in its compressed state or to release the stored energy in a controlled manner.

It is conventional to fabricate the emergency brake housing in two opposing sections: a cup or head for holding the large compression spring, and an adaptor for receiving the cup. The emergency brake cup and the corresponding adaptor each have an open central area and an annular peripheral edge. These peripheral edges are joined to form the emergency brake housing. At this peripheral junction, the peripheral edge of the elastomeric diaphragm is also attached. The two opposing sections are coupled together with sufficient force to maintain an air-tight seal between the diaphragm and the housing, dividing the housing into two chambers. The adaptor includes an inlet that allows for fluid communication between the second sealed chamber and the on-board pressurized air supply.

Similarly, it is also conventional to fabricate the service brake housing in two opposing sections: a cup or head, and an adaptor for receiving the cup. As with the emergency brake, each of these parts has an open central area and an annular peripheral edge joined to form the service brake housing, with the peripheral edge of the diaphragm sealingly attached between. The service brake housing is also divided into two chambers, and the adaptor also includes an inlet which allows for fluid communication between the second sealed chamber and the on-board pressurized air supply.

In a tandem brake actuator which includes both an emergency brake assembly and a service brake assembly (sometimes called a double-diaphragm adaptor), a single adaptor piece is provided which has oppositely facing axially aligned receptacles for attachment to, respectively, the emergency brake housing cup and the service brake housing cup. Normal positioning of the two elastomeric diaphragms results in the adaptor being part of the sealed chambers of both the service brake and the emergency brake. As a result, it is common for a tandem adaptor to have an hourglass shape and to include the openings into each chamber for attachment to the on-board air supply for the brakes.

It will be appreciated that each adaptor (whether emergency brake adaptor, spring brake adaptor, or tandem adaptor) requires numerous critically angled walls together with a specially positioned inlet opening for attachment to the on-board air supply. Because of its hourglass shape, making a tandem adaptor from steel requires the welding together of two halves. There is great expense involved in creating the necessary tooling to make these two halves, providing inlet openings on each of them, and then attaching them together. As a result, it is more common for adaptor parts to be made from cast aluminum. Not only does the price of aluminum make it an attractive alternative to steel, using cast aluminum also makes it possible to easily establish the critical angles and inlet openings of the adaptor in the mold, thereby avoiding the need for expensive fabrication and tooling. Making adaptors from aluminum is also desirable for a brake manufacturer or remanufacturer to be able to use its conventional existing aluminum molds to inexpensively create adaptor pieces that may be attached to existing housing cups. Casting the adaptor pieces from aluminum is also desirable in that, compared to steel, many different molds may be easily and inexpensively created for the various sized pieces.

Because they have a more simple design, it is also common for emergency brake and service brake housing cups to be made of steel. However, for the same reasons described above, it may be equally advantageous to make these housing cups from aluminum. Thus, depending upon the situation, it may be desirable to make either the adaptor or the housing cup from aluminum, and to make the corresponding piece from the other metal. However, it is difficult to join together such parts when made from dissimilar metals, presenting the continuing problems of assuring that the coupling be air tight as well as safe and secure.

Since unauthorized opening of the emergency brake housing is potentially dangerous to the inexperienced mechanic, and since unauthorized re-sealing using defective seals or improper procedures could result in a poor diaphragm seal or other internal defect, it is also conventional to discourage unauthorized access, disassembly, and reassembly of the emergency brake housing by appending a warning label to the housing and using an attachment means which is temper-resistant or at least tamper-evident, so that a new attachment means, not readily available to unauthorized personnel, is required before the housing can be reassembled. Conventional clamping means also involve additional expense.

Because of the danger presented by the compression of the large spring of these brake systems, numerous inventions have been patented which provide different ways of improving safety. Many of these inventions are directed towards securing the assembly of the two halves of the housing between which the diaphragm is deployed.

The below-listed United States and foreign patents are known to exist:

| No. | Patent No. | Date | Inventor |
| --- | --- | --- | --- |
| 1 | 2,541,205 | February 13, 1951 | Christophersen |
| 2 | 3,101,133 | August 20, 1963 | House |
| 3 | 3,696,711 | December 16, 1975 | Kurichh, et al |
| 4 | 3,926,094 | October 10, 1972 | Berg, et al |
| 5 | 7308049.6 | 1973 | Bosch (German) |
| 6 | 028074 | June 27, 1978 | Girling (G.B.) |
| 7 | 4,850,263 | July 25, 1989 | Rumsey |
| 8 | 4,960,036 | October 2, 1990 | Gummer |
| 9 | 5,062,455 | November 5, 1991 | Schurter |
| 10 | 5,067,391 | November 26, 1991 | Choinski |
| 11 | 5,193,432 | March 16, 1993 | Smith |
| 12 | 5,205,205 | April 27, 1993 | Choinski |
| 13 | 5,285,716 | February 15, 1994 | Thompson |
| 14 | 5,315,918 | May 31, 1994 | Pierce |
| 15 | 5,353,688 | October 11, 1994 | Pierce |

-continued

| No. | Patent No. | Date | Inventor |
| --- | --- | --- | --- |
| 16 | 5,676,036 | October 14, 1997 | Choinski |
| 17 | 5,771,774 | June 30, 1998 | Stojic |
| 18 | 6,012,378 | January 11, 2000 | Hicks |

These patents disclose different methods and apparatus for attachment of the two halve (cups) of a brake housing. Annular clamps are taught in U.S. Pat. No. 2,541,205 to Christophersen; U.S. Pat. No. 4,960,036 to Gummer, et al; and U.S. Pat. No. 5,193,432 to Smith. Such clamps are bulky and cumbersome in that the flanges, nuts and bolts used for connection may not easily fit into the cramped brake area of a vehicle. They also add additional expense to the overall cost of the unit.

Various ways of crimping or bending the edge flanges of the two housing cups are taught in U.S. Pat. No. 3,101,133 to House; a German Patent Application No. G 73 08 049.6 filed by Bosch; and U.S. Pat. No. 4,850,263 to Rumsey. The Rumsey patent utilizes overlapping lips where one is spinned over the other and bent into position by use of the lathe or other suitable machine. Each of these devices is limited to the use of a strong bendable metal such as steel.

The four U.S. Patents to Gummer and Choinski (U.S. Pat. Nos. 4,960,036; 5,067,391; 5,205,205 and 5,676,036) each disclose use of a clamp ring, use of a metal spun annular crimp of a flange on one of the housing cups, and the use of a separate circular channel clamp for attachment of the housing cups. Clamp rings are bulky and dangerous as noted above; and, although the circular channel clamp is a more permanent structure, it, as well as the metal spun flanges, is limited to use with steel. Moreover, there is a significant cost associated with providing a separate circular channel clamp. This cost is particularly high because of the circular design of the clamp that results in a large amount of scrap being left over after the clamp is fabricated.

The use of a snap ring for attachment is shown in U.S. Pat. No. 5,353,688 to Pierce, et al, and in U.K. Patent No. GB 2,000,225A to Girling Midland, etc. U.S. Pat. No. 5,315,918 to Pierce discloses several methods of attachment including bayonet, screw thread, slots plus pins, and welds. Each of these methods of attachment requires that the cup and/or adaptor be uniquely modified in order to hold or accept such things as the snap ring, the pins, the screw threads, the slots, etc. Such adaptations render the cup and adaptor parts unusable except with correspondingly adapted parts, thereby severely limiting overall use, especially for repair and reuse. In addition, spot welds near the diaphragm may cause damage to the diaphragm thereby affecting the security of the airtight seal.

The welding together of two halves of like material is shown in U.S. Pat. No. 5,062,455 to Schurter and U.S. Pat. No. 5,285,716 to Thompson.

A significant problem presented by the use of annular clamps and the like to join brake housing cups made of dissimilar metals is that the ears, nuts and bolts of such clamps create significant clearance problems in the close tolerances of the brake area of a vehicle, making such methods of attachment unattractive. With the ever changing designs for commercial vehicle brakes, the available space for brake actuators is diminishing while the demand for ever stronger emergency brake actuators has increased. Increasing load sizes, new regulations and other factors have created a need for additional power in a spring brake with the same dimensional profile as existing tandem (double-diaphragm) spring brakes.

A stronger spring brake that takes up the same or a smaller space can result in great savings in the transportation industry. Under present regulations, a loaded truck must be able to apply its brakes and hold its position on a twenty percent (20%) grade. For many heavy vehicles, in order to accomplish this requires additional brake actuators and/or additional axles with brake actuators on them. With stronger brake actuators, fewer of them are needed to bring or hold such a vehicle at rest, thereby saving the cost of the additional brake actuators and/or additional axles.

There is also a need for a more powerful spring brake that fits into a smaller space. This need is driven by such factors as the installation of vehicle air suspensions, lowered floor heights, shorter wheel bases, and the addition of new and bulky chassis equipment. All of these factors result in competition for the same space (profile) occupied by the spring brake actuator.

A spring brake assembly of smaller size that provides the same power as a larger assembly will also reduce weight and cost. A typical truck tractor and semi trailer may use 8 spring brake actuators on its axles. Replacing these with smaller units having the same strength that are two pounds lighter will reduce the weight by 16 pounds. While this may not seem significant at first blush, a liquid hauling vehicle is frequently loaded to the exact legal limit. Over the life of that vehicle, the 16-pound reduction will convert to thousands of dollars of hauling revenue.

Stronger brake assemblies deployed in the same space can improve the stopping characteristics of a vehicle thereby potentially increasing the gross vehicle weight allowance for the vehicle (i.e. more payload). It is therefore desirable to provide an apparatus for joining together brake actuator adaptors and housing cups made of dissimilar metals in a safe, sealed way that minimizes the exterior profile of the actuator unit, and which allows for a more powerful unit to be deployed in the same space.

Finally, in order to avoid increasing labor and service costs, it is common for a brake actuator having a single worn out component (e.g. a diaphragm) to simply be replaced in its entirety by another brake actuator, as opposed to repairing the actuator or replacing the worn out part in the field. When a diaphragm wears out, the remaining parts of the used brake actuator, particularly the aluminum parts (be they housing cups or adaptor), can be recycled into a remanufactured unit instead of being disposed of.

It is therefore desirable to provide a secure device for coupling brake actuator adaptors and housing cups made of dissimilar metals that gives the brake actuator a long useful life, and which allows the aluminum parts (adaptor or housing cups) to be recycled for use in a remanufactured unit.

The present invention solves these problems by providing an apparatus for securely joining housing cups and adaptors made of dissimilar metals in a reduced exterior profile that allows for a more powerful unit while preserving the ability to recycle the aluminum parts for use in a remanufactured brake actuator.

SUMMARY OF THE INVENTION

The present invention provides an improved apparatus for securely coupling either a service brake actuator housing cup or an emergency brake actuator housing cup, or both, to a corresponding adaptor where the housing cup(s) and adaptor are made of dissimilar metals. The device of the present invention allows such coupling to be accomplished within a reduced overall profile. The reduced profile allows the brake actuator to fit into the ever shrinking spaces available underneath the vehicle, and the unique design allows for a more efficient emergency brake actuator capable of holding off a stronger emergency brake spring.

In one aspect of the invention, the housing cups are made of steel and the adaptor is made of cast aluminum. In this aspect, the open end of each steel housing cup is provided with a substantially vertical cylindrical wall defining an annular edge. The corresponding annular edges of each aluminum adaptor cup are provided with a uniquely shaped engagement structure. This structure is designed (1) to accomplish sealing engagement with a slightly enlarged annular edge of an elastomeric diaphragm to form an airtight chamber with the adaptor cup, (2) to hold an annular retaining piece on the outside of the adaptor cup in a location that is spatially separated from the edge of the diaphragm, and (3) to provide a mating surface for supporting the annular edge of the housing cup. The engagement structure at the outer edge of the adaptor includes three distinct outwardly facing annular ridges. The first and outermost ridge is axially recessed from the second ridge which, in turn, is axially recessed from the third ridge. The outside diameter of the second ridge is the same as the inside diameter of the cylindrical wall of the corresponding housing cup. A first annular groove is provided between the first and second ridges, and a second annular groove is provided between the second and third ridges.

The slightly enlarged annular peripheral edge of the elastomeric diaphragm fits over the upper edge of the adaptor, over the first (outermost) ridge, and into the first annular groove, the first ridge and groove holding the slightly enlarged peripheral edge in place. A discontinuous annular steel retaining piece is fitted into the second groove. This retaining piece has at least one break or opening therein to allow it to be opened for fitment into the second groove. The substantially vertical cylindrical wall of the housing cup is snugly fitted over the first two ridges of the adaptor such that the wall compresses the annular peripheral edge against the first ridge of the adaptor, the wall also coming into firm contact with both the second ridge of the adaptor and the annular steel retaining piece.

It is not feasible to securely weld the dissimilar metals of the housing cup and the adaptor together; however, it is possible to weld steel to steel. Accordingly, the lower edge of the annular cylindrical steel wall is welded to the annular steel retaining piece to secure it in place. The retaining piece may have a single break therein, or multiple breaks resulting in multiple pieces. One or more welds are used to join the annular steel piece(s) to the annular cylindrical wall of the housing cup, thereby coupling the steel housing cup to the aluminum adaptor and creating a sealed chamber inside the adaptor. The weld may be continuous or in parts around the diameter.

The attachment of the edges of the diaphragm over the top edge of the adaptor results in an advantageous positioning of the diaphragm. Instead of extending towards the center of the housing at an angle perpendicular to the cylindrical wall of the housing cup, the edges of the diaphragm have a substantially vertical angle that corresponds closely to the cylindrical wall. This angle, in conjunction with the steep vertical angle of the cylindrical housing wall itself, makes it possible for more of the surface area of the diaphragm to be available to impart pressure to a plate that holds off the large compression spring. In particular, a pressure plate having a larger surface area may be used, all of which area makes contact with the adjacent diaphragm as it expands. The steeper initial angle of the periphery of the diaphragm results in less drop off at the shoulder where the diaphragm makes critical contact with the pressure plate. The more of the expanded diaphragm which contacts the pressure plate, the less air pressure required to hold off the large compression spring; the same air pressure supplied to such a larger plate or member imparts greater force to hold off this spring.

In another aspect of the invention, the adaptor is made of steel and the housing cups are made of cast aluminum. In this aspect, the outwardly facing annular ridges are provided on the aluminum housing cup(s), and the steel adaptor has a substantially vertical cylindrical side wall. The coupling in this aspect is inverted from the coupling of the first aspect. Otherwise, the parts and function of the coupling are the same, with the exception that there is no advantageous angle of the peripheral member.

In a third aspect, all parts are made of steel. In this aspect, the outwardly facing annular ridges may be provided on the adaptor with the housing cup having a substantially vertical cylindrical side wall; or the outwardly facing annular ridges may be provided on the housing cup with the adaptor having a substantially vertical cylindrical side wall.

In each aspect, it is important to obtain a secure seal where the edge of the elastomeric diaphragm meets the adaptor. In order to prevent heat from the welding process from damaging this peripheral edge, the coupling of the present invention is designed such that the weld(s) between the retaining piece and the cylindrical wall are physically distant from the edge of the diaphragm.

In addition, the welded retaining piece may be later removed without damage to the aluminum part (whether housing cup or adaptor), allowing for the aluminum part to be recycled for use in a remanufactured brake actuator.

It is therefore a primary object of the present invention to provide an apparatus for securely coupling a housing cup to an adaptor piece of either an emergency brake assembly or service brake assembly of an air brake actuator where the housing cup and adaptor piece are made of dissimilar metals.

It is therefore an object of the present invention to provide an apparatus for securely coupling a steel housing cup to an aluminum adaptor piece of an air brake actuator.

It is also an object of the present invention to provide an apparatus for securely coupling an aluminum housing cup to a steel adaptor piece of an air brake actuator.

It is also an object of the present invention to provide an apparatus for securely coupling a steel housing cup to a steel adaptor piece of an air brake actuator.

It is another primary object of the present invention to provide an apparatus for assuring a tight seal between the peripheral edge of an elastomeric diaphragm and the adaptor piece of either the service brake or emergency brake housing of an air brake actuator.

It is another primary object of the present invention to provide an apparatus for coupling a housing cup to an adaptor piece of either an emergency brake assembly or service brake assembly of an air brake actuator which has a reduced exterior profile.

It is therefore an important object of the present invention to provide an apparatus for coupling a housing cup to an adaptor piece of an air brake actuator which reduces the overall size of the actuator making it possible for the actuator to fit into a smaller space on a vehicle.

It is another primary object of the present invention to provide an apparatus for coupling a housing cup to an adaptor piece of an air brake actuator which provides an advantageous angle of attachment of the peripheral edge of an elastomeric diaphragm inside the actuator which improves the overall efficiency of the actuator.

It is another important object of the present invention to provide an apparatus for coupling a housing cup to an adaptor piece of an air brake actuator made of dissimilar metals that allows for the aluminum piece (either housing cup or adaptor) to be recycled and used in a remanufactured brake actuator unit.

It is another important object of the present invention to provide an apparatus for coupling a housing cup to an adaptor piece of an air brake actuator made of dissimilar metals using an annular steel retaining piece that fits into a groove in the aluminum part (either adaptor or housing cup) and is welded to the steel part (either housing cup or adaptor).

It is another important object of the present invention to provide an apparatus for coupling a housing cup to an adaptor piece of an air brake actuator made of dissimilar metals using an annular steel retaining piece that is welded to the steel piece (either housing cup or adaptor) where the weld is physically distant from the peripheral edge of the diaphragm in order to avoid damaging the elastomeric part.

It is a further important object of the present invention to provide a method and apparatus for securely attaching an aluminum or steel adaptor piece to a selected steel brake housing without cumbersome and space consuming annular clamps having ears, nuts or bolts.

It is a further important object of the present invention to provide a method and apparatus for securely attaching an aluminum or steel adaptor piece to a selected steel housing cup that does not require any major modification of the tooling necessary to create the adaptor or housing.

It is a further object of the present invention to provide a variety of different annular steel pieces each having at least one break therein for use in securely attaching an aluminum or steel adaptor piece to a housing cup of an air brake actuator made of dissimilar metal.

Additional objects of the invention will be apparent from the detailed descriptions and the claims herein.

DETAILED DESCRIPTION OF THE DRAWINGS

Figures 1, 1A:
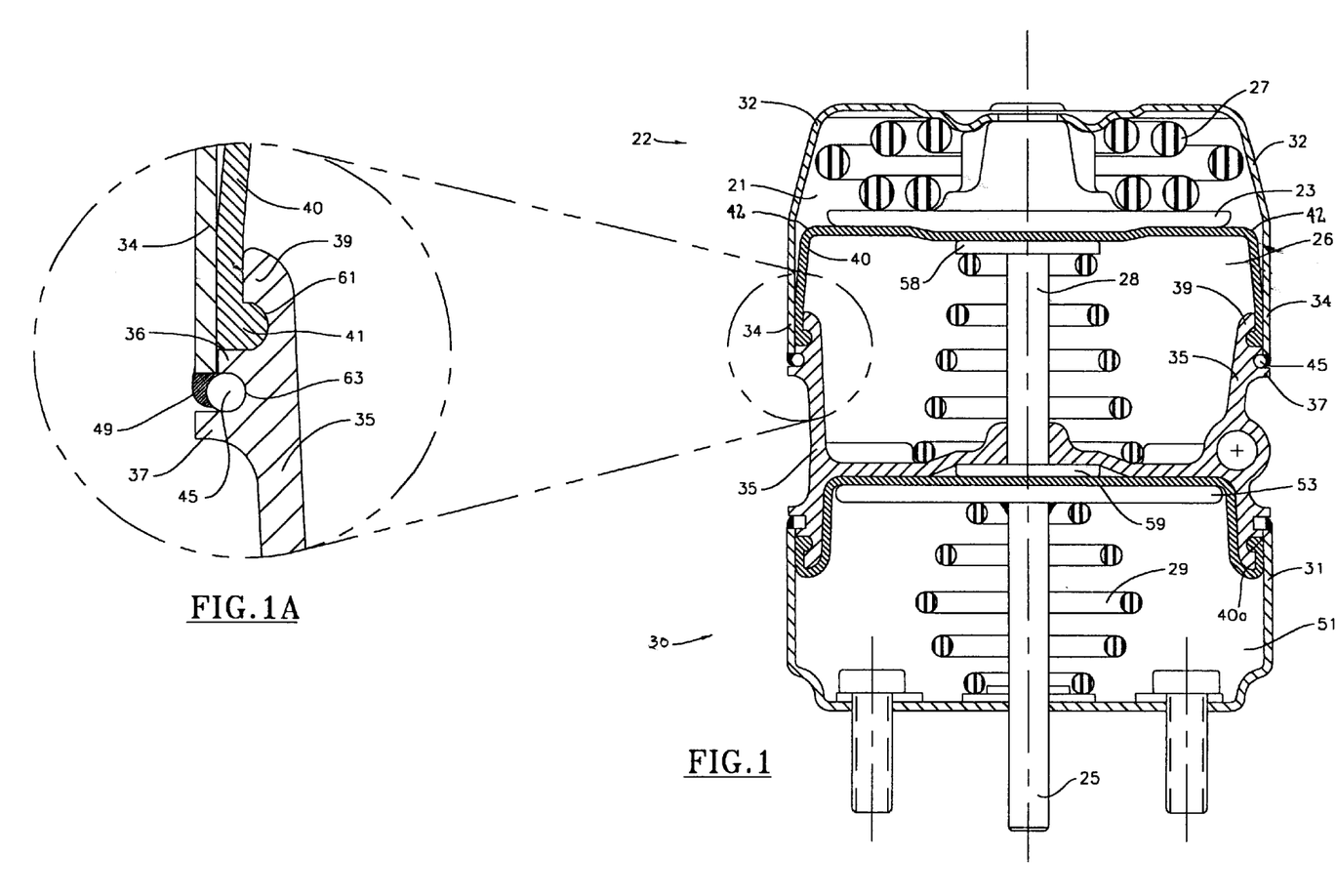
FIG. 1 is a cross sectional side view of a tandem air brake actuator incorporating the coupling of the present invention in both the service and emergency brake assemblies.
FIG. 1A is an enlarged sectional side view of the coupling of the present invention shown in the emergency brake assembly of FIG. 1.

Referring to the drawings wherein like reference characters designate like or corresponding parts throughout the several views, and referring particularly to FIGS. 1 and 1A it is seen that a tandem spring brake actuator, generally 20, includes an emergency brake assembly, generally 22, attached in axial alignment with a service brake assembly, generally 30. The interior of the emergency brake assembly 22 is defined by an open-ended housing cup 32, which is joined at its annular perimeter to an open-ended adaptor 35. An elastomeric diaphragm 40 is sealingly attached at the peripheral junction between the housing cup 32 and the adaptor 35 thereby dividing the emergency brake assembly 22 into two chambers 21 and 26. A large compression spring 27 is deployed in the first chamber 21. A pressure plate 23 is also provided in the first chamber between compression spring 27 and diaphragm 40 as shown in FIG. 1.

The second chamber 26 of the emergency brake assembly 22 is provided on the opposite side of diaphragm 40. Chamber 26 is sealed and has an opening 24 for connection to an on-board pressurized air supply. Introduction of pressurized air through opening 24 into chamber 26 expands diaphragm 40 which moves pressure plate 23 thereby compressing (holding off) compression spring 27. This position is shown in FIG. 1. A slidable force transfer rod 28 is provided in chamber 26 for transferring force from spring 27 out of the emergency brake 22. Removal of pressurized air from chamber 26 allows compression spring 27 to expand, thereby pushing pressure plate 23 against diaphragm 40, intermediate adaptor push plate 58 and actuator rod 28, extending rod 28 into the service brake assembly 30.

The interior of the service brake assembly 30 is defined by an open-ended housing cup 31 that is joined at its annular perimeter to an open-ended adaptor 35. A second elastomeric diaphragm 40a is sealingly attached at the peripheral junction between the housing cup 31 and the adaptor 35 thereby dividing the service brake assembly into two chambers 51 and 54. A push rod 25 is deployed in the first chamber 51. A pressure plate 53 is also provided in the first chamber between push rod 25 and diaphragm 40a as shown in FIG. 1.

A second chamber 54 is provided in the service brake assembly 30 on the opposite side of diaphragm 40a. Chamber 54 is sealed and has an opening 24 for connection to an on-board pressurized air supply. Introduction of pressurized air through opening 24 into chamber 54 expands diaphragm 40a thereby transferring force to pressure plate 53 and push rod 25, extending rod 25 out of chamber 51 to activate the brakes of the vehicle. Pressurized air is variably introduced and removed from chamber 54 in response to the operation of the brake pedal of the vehicle. This causes diaphragm 40a to expand and contract, thereby moving actuator rod 25 in and out to apply or release the brakes of the vehicle as it is being operated. Upon withdrawal of air pressure to chamber 54, return spring 29 causes push rod 25 to be retracted back into the service brake housing.

In contrast, upon the withdrawal of air pressure from chamber 26 of the emergency brake assembly, spring 27 pushes rod 28 into the service brake assembly as described previously. As push rod 28 moves into chamber 54, it presses plate 59 against diaphragm 40a which pushes plate 53 against rod 25, extended rod 25 out of the service brake 30 to apply the brakes of the vehicle. This ordinarily occurs when the vehicle is parked: pressure is withdrawn from emergency chamber 26 and heavy spring 27 expands causing the brakes to be applied. This may also occur in an emergency situation where there is a failure in the air pressure system: the absence of pressure in chamber 26 allows heavy spring 27 to expand and apply the brakes of the vehicle.

Figures 3, 4:
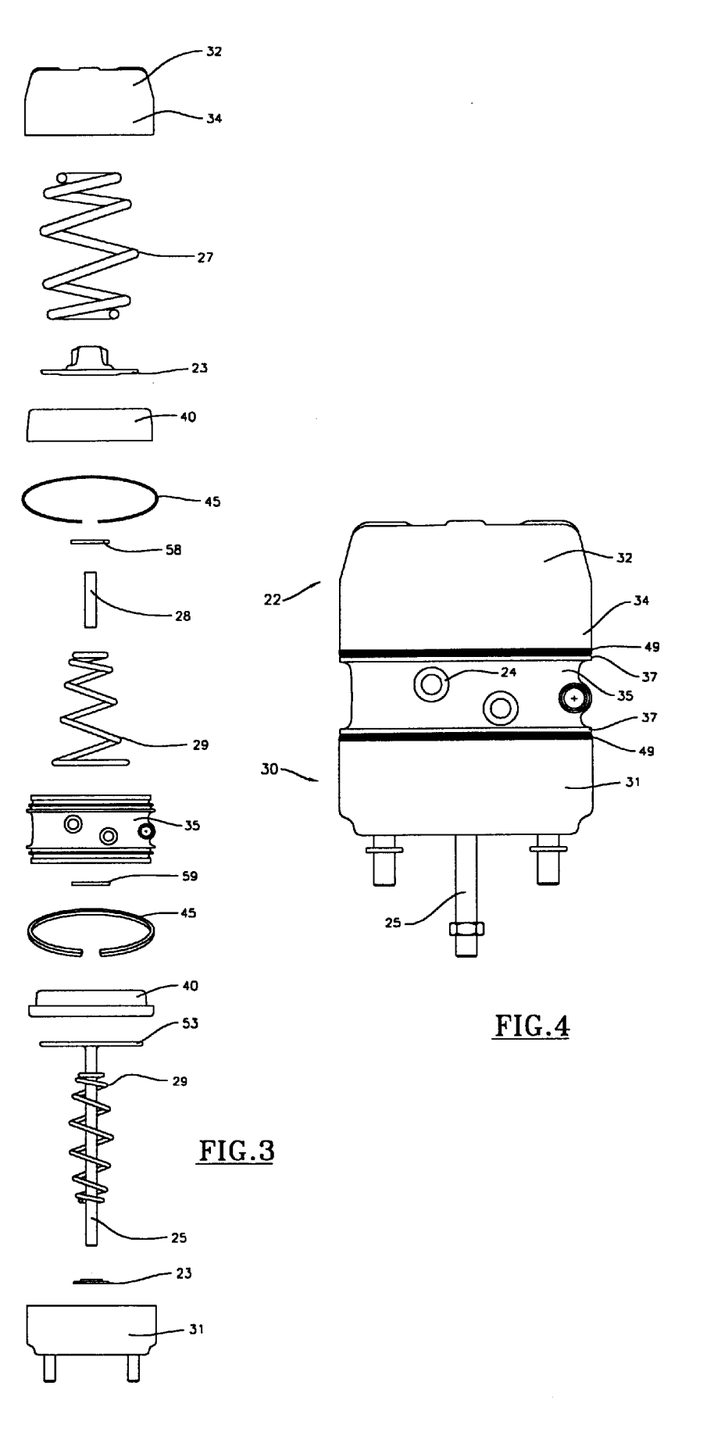
FIG. 3 is an exploded view showing the parts of a tandem service brake and emergency brake actuator employing the coupling of the present invention.
FIG. 4 is a side view showing an assembled tandem service brake and emergency brake actuator employing the coupling of the present invention.
Figure 5:
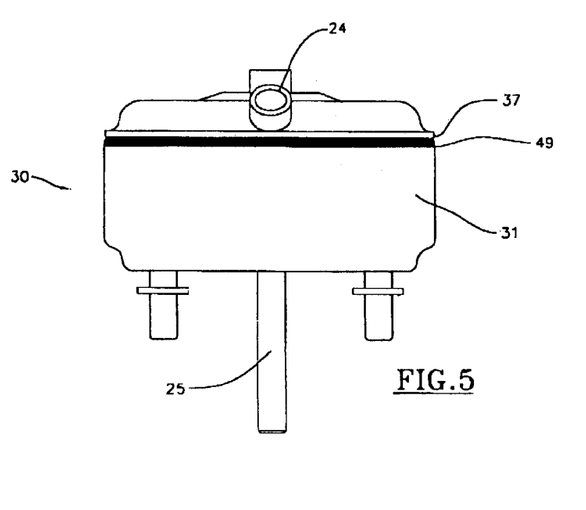
FIG. 5 is a side view of a stand alone service brake assembly using the coupling of the present invention.
Figure 6:
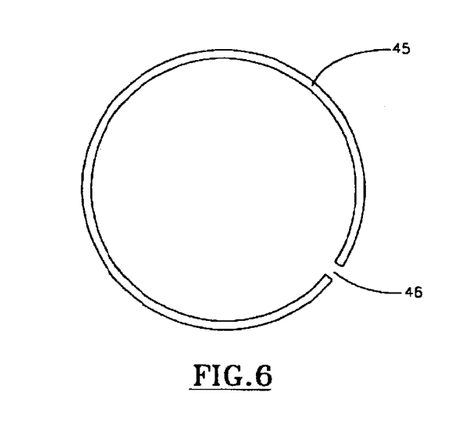
FIG. 6 is a top perspective view of an annular steel member showing a single opening therein.
Figure 7:
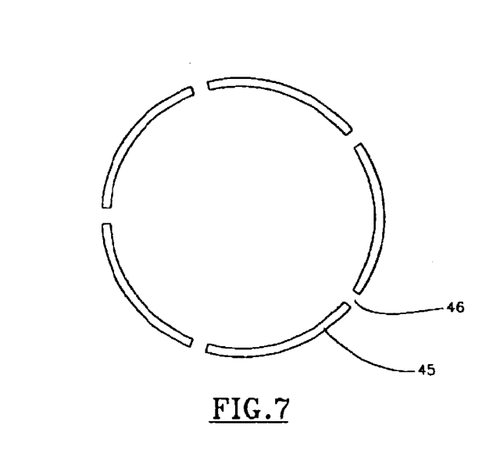
FIG. 7 is a top perspective view of an annular steel member showing multiple openings therein.

Turning to FIGS. 1, 4 and 5 it is seen that the coupling of the present invention may be provided to join an emergency brake housing cup 32 to an adaptor 35 (as shown in FIG. 1), to join a service brake housing cup 31 to an adaptor 35 (as shown in FIG. 5), or to join both the emergency and service brake housing cups 31 and 32 to an adaptor 35 (as shown in FIG. 4).

Referring to the detail of the emergency brake assembly 22 shown in FIG. 1A, it is seen that the coupling of the present invention calls for the open end of steel housing cup 32 to have a substantially vertical cylindrical wall 34. An engagement structure corresponding to wall 34 is provided on the open end of aluminum adaptor 35. This engagement structure includes three distinct outwardly facing annular ridges. The first ridge 39 is provided at the outermost annular edge of adaptor 35. A second outwardly facing annular ridge 36 is provided in axial alignment with ridge 39 and separated therefrom, thereby defining a groove 61 between ridges 39 and 36. A third outwardly facing annular ridge 37 is provided in axial alignment with ridge 36 and separated therefrom, thereby defining a second groove 63 between ridges 36 and 37. The first ridge 39 is axially recessed from the second, central ridge 36 which, in turn, is axially recessed from lower ridge 37. The outside diameter of central ridge 36 is the same as the inside diameter of housing cup wall 34.

A discontinuous annular retaining piece 45 is provided which fits into the second groove 63 of adaptor 35. At least one break or opening is provided in retaining piece 45 in order to allow it to be opened for fitment into groove 63. Retaining piece 45 may be provided in a plurality of smaller pieces, each of which fits into a section of groove 63. The cross sectional shape of groove 63 and corresponding retaining piece 45 may be of various shapes (round, square, rectangular, flat, hexagonal, semi-circular, L-shaped, etc.) depending upon the application.

The annular outside edge of elastomeric diaphragm 40 is provided with an annular ridge (lip) or bulge 41 having a thicker cross-section than the remainder of the diaphragm 40. Diaphragm 40 is designed to be stretched over ridge 39 of adaptor 35 such that the lip or ridge 41 of diaphragm 40 fits into the first groove 61 of adaptor 35.

The coupling of the present invention is made by first stretching elastomeric diaphragm 40 over adaptor 35 such that ridge 41 of diaphragm 40 fits into the first groove 61. Retaining piece(s) 45 is (are) placed in the second groove 63 of adaptor 35. Then, the cylindrical wall 34 of housing cup 32 is fitted over adaptor 35 such that diaphragm 40 is squeezed between wall 34 and ridge 39. The lower peripheral edge of wall 34 is pushed against adaptor 35 such that the inside of wall 34 mates snugly with the second ridge 36 of adaptor 35, the lower peripheral edge of wall 34 touching retaining piece(s) 45. One or more welds are then employed to attach retaining piece(s) 45 to wall 34.

It is to be appreciated that the emergency brake coupling shown in FIG. 1 may be inverted such that the housing cup 32 may be made of cast aluminum and include ridges 37, 36 and 39 and grooves 61 and 63; and that adaptor 35 may be made of steel and have the substantially vertical cylindrical wall 34 which is welded to retaining piece(s) 45.

Figure 2:
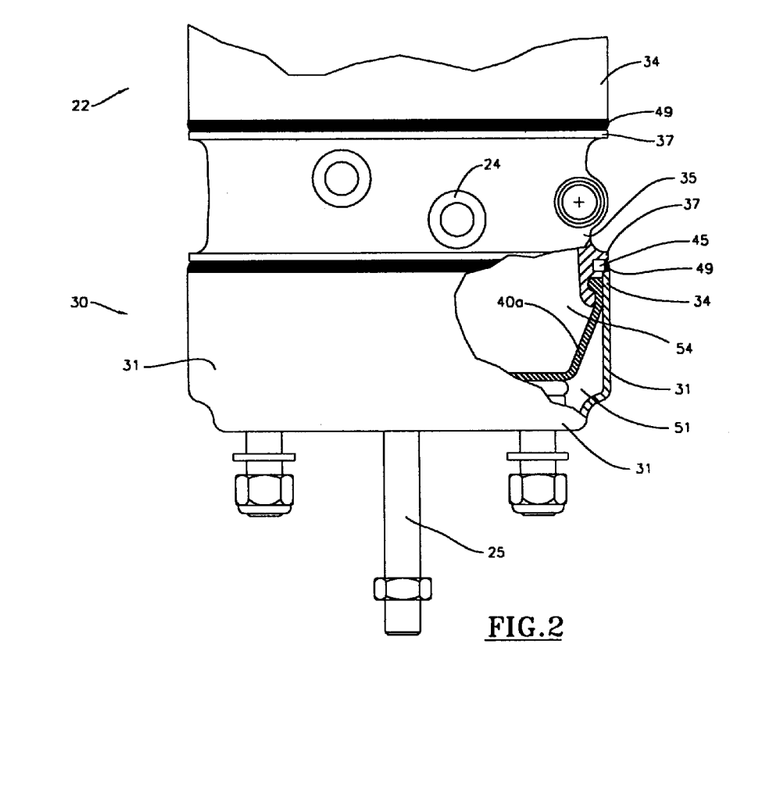
FIG. 2 is a partially cut away side view of the service brake assembly of a tandem brake actuator showing detail of the coupling of the present invention.
Figure 2A:
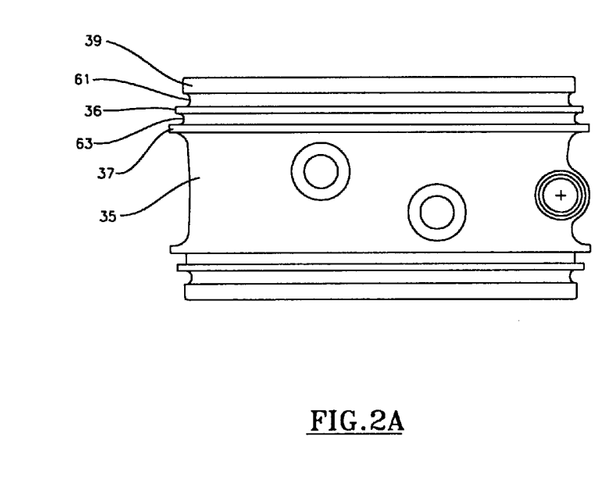
FIG. 2A is a side elevational view of an adaptor incorporating the coupling of the present invention on both the service and emergency brake sides.

Referring to the detail of the service brake assembly 30 shown in FIG. 2, it is seen that the coupling of the present invention may also be used to couple the service brake housing cup 31 to adaptor 35 in a fashion that is substantially identical, although inverted, from the emergency brake assembly. The open end of steel housing cup 31 of the service brake assembly is provided with a substantially vertical cylindrical wall 34. An engagement structure corresponding to wall 34 is provided on the open end of aluminum adaptor 35. As on the emergency side, this engagement structure includes three distinct outwardly facing annular ridges. The first ridge 39 is provided at the outermost annular edge of adaptor 35. A second outwardly facing annular ridge 36 is provided in axial alignment with ridge 39 and separated therefrom, thereby defining a groove 61 between ridges 39 and 36. A third outwardly facing annular ridge 37 is provided in axial alignment with ridge 36 and separated therefrom, thereby defining a second groove 63 between ridges 36 and 37. The first ridge 39 is axially recessed from the second, central ridge 36 which, in turn, is axially recessed from lower ridge 37. The outside diameter of central ridge 36 is the same as the inside diameter of housing cup wall 34.

As on the emergency side, a discontinuous annular retaining piece 45 is provided which fits into the second groove 63 of adaptor 35. At least one break or opening is provided in retaining piece 45 in order to allow it to be opened for fitment into groove 63. Retaining piece 45 may be provided in a plurality of smaller pieces, each of which fits into a section of groove 63. The cross sectional shape of groove 63 and corresponding retaining piece 45 may be of various shapes (round, square, rectangular, flat, hexagonal, semi-circular, L-shaped, etc.) depending upon the application.

The annular outside edge of elastomeric diaphragm 40a is provided with an annular ridge (lip) or bulge 41a having a thicker cross-section than the remainder of the diaphragm 40a. Diaphragm 40a is designed to be stretched over ridge 39 of adaptor 35 such that the ridge or lip 41a of diaphragm 40a fits into the first groove 61 of adaptor 35.

The coupling on the service side is accomplished in the same fashion as on the emergency side, by first stretching elastomeric diaphragm 40a over adaptor 35 such that ridge 41a of diaphragm 40a fits into the first groove 61. Retaining piece(s) 45 is (are) placed in the second groove 63 of adaptor 35. Then, the cylindrical wall 34 of housing cup 31 is fitted over adaptor 35 such that diaphragm 40a is squeezed between wall 34 and ridge 39. The lower peripheral edge of wall 34 is pushed against adaptor 35 such that the inside of wall 34 mates snugly with the second ridge 36 of adaptor 35, the lower peripheral edge of wall 34 touching retaining piece(s) 45. One or more welds are then employed to attach retaining piece(s) 45 to wall 34.

It is to be appreciated that the service brake coupling shown in FIG. 2 may be inverted such that the housing cup 31 may be made of cast aluminum and include ridges 37, 36 and 39 and grooves 61 and 63; and that adaptor 35 may be made of steel and have the substantially vertical cylindrical wall 34 which is welded to retaining piece(s) 45.

Because diaphragm 40 of the emergency brake assembly (or diaphragm 40a of the service brake assembly) is stretched over the outside edge of adaptor 35 such that bulge 4 (or 41a) fits into groove 61, it extends away from adaptor ridge 39 beginning at a substantially vertical angle. When chamber 26 of the emergency brake assembly (or chamber 54 of the service brake assembly) is fully inflated and diaphragm 40 (or 40a) is fully extended, the substantially vertical angle of diaphragm 40 (or 40a) along the inside of wall 34 results in a much smaller gap between the inside edge of wall 34 and shoulder 42 of diaphragm 40 (or 40a). This smaller gap makes more surface area of diaphragm 40 (or 40a) available to press against pressure plate 23 of the emergency brake assembly (or plate 53 of the service brake assembly). Thus, a larger pressure plate 23 (or 53) may be efficiently employed. The increased usable surface area of plate 23 (or 53) for receiving pressure from diaphragm 40 (or 40a) results in a much more efficient brake actuator.

On the emergency side, the larger usable surface area on plate 23 means that less air pressure is required to hold off the large compression spring 27; alternatively, applying the same air pressure on the larger usable surface area allows the unit to hold off a stronger spring 27. A stronger spring 27 is capable of applying more force to the brakes of the vehicle. Similarly, on the service side, the larger usable surface area on plate 53 means that less air pressure is required to apply the brakes of the vehicle when in operation; alternatively, applying the same air pressure on the larger usable surface area of plate 53 allows the unit to apply more force to the brakes. One of the most important aspects of the coupling of the present invention is that it does not increase and may actually decrease the overall exterior profile of the brake actuator unit (i.e. neither the emergency nor service brake assemblies are any larger in size). Thus, the coupling of the present invention allows for a brake actuator unit of the same or smaller size to be considerably stronger and able to apply more force to the brakes of a vehicle.

DESCRIPTION OF THE PREFERRED EMBODIMENTS

In the preferred embodiment, the housing cups 31, 32 of the present invention are made of steel and the adaptor 35 is made of aluminum and cast in an appropriate mold. However, the present invention works equally well if all parts are made of steel, or if the adaptor 35 is made of steel and the housing cups 31, 32 made of aluminum. Tooling for aluminum parts (whether housing cups or adaptor) is far less expensive than forming the same part from a steel sheet.

Openings 24 for attachment of each chamber to the pneumatic source are provided in the adaptor 35. The inside diameter of lower housing cup wall 34 should be essentially the same as the outside diameter of annular ridge 36 for snug metal-to-metal fitment. The diameter of ridge 39 should be slightly smaller than that of ridge 36 in order to allow diaphragm 40 (or 40a) to fit between ridge 39 and housing wall 34.

Annular retaining piece 45 should have a diameter that is approximately the same as groove 63. Piece 45 should have at least one opening therein to allow it to be easily placed over ridge 36 and into groove 63. However, retaining piece 45 may have more than one opening therein resulting in a plurality of discontinuous pieces 45 which may be placed in groove 63, each such piece being separately welded to wall 34. In the preferred embodiment shown in FIG. 1, an annular weld (that is discontinuous only at the break(s) 46 in piece 45) between piece 45 and wall 34 is preferred for maximum attachment security.

Several alternative embodiments of the apparatus are also available. The upper lip of ridge 39 can have a configuration that is angled, grooved, drilled, chamfered, machined or as cast. Retaining piece 45 may be formed, cast, stamped, rolled, punched or machined and may be formed in one of several different configurations having different cross sectional shapes such as: circular, semi-circular, rectangular, square, strip or poly-sided. When such alternative configurations are used, groove 63 is formed to correspond to the cross-sectional shape of retaining piece 45. Piece 45 may be made from ferrous or non-ferrous material, and may have at least one break therein to facilitate placing it over the adaptor base. Piece 45 should have a diameter roughly the same as groove 63 such that it fits snugly therein with good metal-to-metal contact.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

We claim:

1. A coupling for a brake actuator comprising:
   a. a brake actuator housing cup having an open end that includes a substantially vertical cylindrical wall;
   b. a brake actuator adaptor having an open annular end corresponding to the open end of said housing cup;
   c. an engagement structure on the open end of said adaptor comprising a first outwardly facing annular ridge at the outermost annular edge of said adaptor, a second outwardly facing annular ridge in axial alignment with said first ridge and separated from said first ridge by a first annular groove, and a third outwardly facing annular ridge in axial alignment with said second ridge and separated from said second ridge by a second annular groove;
   d. an annular retaining piece provided in said second groove; and
   e. at least one weld connecting said retaining piece to the cylindrical wall of said housing cup for holding said housing cup securely against said adaptor.

2. The coupling described in claim 1 wherein said housing cup is made of steel, said adaptor is made of aluminum, and said retaining piece is made of ferrous metal.

3. The coupling described in claim 1 wherein an elastomeric diaphragm is provided over the open end of the first ridge of said adaptor and stretched across said adaptor dividing the interior of said brake actuator into two chambers, said diaphragm having an enlarged annular peripheral lip for engagement with said first groove.

4. The coupling described in claim 1 wherein said retaining piece is discontinuous.

5. The coupling described in claim 1 wherein said retaining piece has a cross section selected from the group consisting of: circular, semi-circular, square, rectangular, oval, L-shaped, hexagonal, and octagonal.

6. The coupling described in claim 3 wherein said second ridge is axially recessed from said third ridge, and said first ridge is axially recessed from said second ridge.

7. The coupling described in claim 6 wherein the outside diameter of said second ridge is the same as the inside diameter of said cylindrical housing cup wall.

8. The coupling described in claim 3 wherein the peripheral edge of said diaphragm adjacent to said lip extends away from said first ridge at a substantially vertical angle when said diaphragm is expanded.

9. The coupling described in claim 8 wherein an annular peripheral lip is provided on said diaphragm for fitment into said first groove.

10. The coupling described in claim 9 wherein an increased surface area of said diaphragm is available to make direct contact with a pressure imparting plate inside said actuator.

11. An emergency brake actuator for a vehicle comprising:
   a. an enclosed housing including a housing cup and an adaptor, said housing cup having an open end that includes a substantially vertical cylindrical wall, said adaptor having an open annular end corresponding to the open end of said housing cup;
   b. an elastomeric diaphragm disposed within said housing and dividing the interior thereof into a first chamber and a second chamber and reciprocally movable therein in response to the delivery and exhaust of pressurized fluid to and from the first chamber, said diaphragm including an annular peripheral lip;
   c. a movable plate member in the first chamber moveable with the diaphragm;

d. an actuator rod in the first chamber operably associated with said moveable plate member for operation of a brake;

e. a compression spring disposed in the second chamber in a position to urge the diaphragm to a first position wherein the first chamber is collapsed upon exhaust of pressurized fluid from the first chamber;

f. an engagement structure on the open end of said adaptor comprising a first outwardly facing annular ridge at the outermost annular edge of said adaptor, a second outwardly facing annular ridge in axial alignment with said first ridge and separated from said first ridge by a first annular groove, and a third outwardly facing annular ridge in axial alignment with said second ridge and separated from said second ridge by a second annular groove;

g. an annular retaining piece provided in said second groove; and h. at least one weld connecting said retaining piece to the cylindrical wall of said housing cup for holding said housing cup securely against said adaptor.

12. The actuator of claim 11 wherein said elastomeric diaphragm is provided over the open end of the first ridge of said adaptor and stretched across said adaptor, the annular lip of said diaphragm being engaged with said first groove.

13. The actuator of claim 12 wherein said said housing cup is made of steel, said adaptor is made of aluminum, said retaining piece is made of ferrous metal, said second ridge is axially recessed from said third ridge, and said first ridge is axially recessed from said second ridge.

14. The actuator of claim 13 wherein the outside diameter of said second ridge is the same as the inside diameter of said cylindrical housing cup wall.

15. The actuator of claim 14 wherein the peripheral edge of said diaphragm extends away from said first ridge at a substantially vertical angle when pressurized fluid is delivered to said first chamber.

16. The actuator of claim 15 wherein an increased surface area of said diaphragm is available to make direct contact with said movable plate member.

17. The actuator of claim 16 wherein said retaining piece is discontinuous.

18. The actuator of claim 16 wherein said retaining piece has a cross section selected from the group consisting of: circular, semi-circular, square, rectangular, oval, L-shaped, hexagonal, and octagonal.

19. A service brake actuator for a vehicle comprising:

a. an enclosed housing including a housing cup and an adaptor, said housing cup having an open end that includes a substantially vertical cylindrical wall, said adaptor having an open annular end corresponding to the open end of said housing cup;

b. an elastomeric diaphragm disposed within said housing and dividing the interior thereof into a first chamber and a second chamber and reciprocally movable therein in response to the delivery and exhaust of pressurized fluid to and from the second chamber, said diaphragm including an enlarged annular peripheral lip;

c. a movable plate member in the first chamber moveable with the diaphragm;

d. an actuator rod in the first chamber operably associated with said moveable plate member for operation of a brake;

e. a return spring disposed in the first chamber in a position to urge the diaphragm to a first position wherein the first chamber is collapsed upon exhaust of pressurized fluid from the first chamber; and f. an engagement structure on the open end of said adaptor comprising a first outwardly facing annular ridge at the outermost annular edge of said adaptor, a second outwardly facing annular ridge in axial alignment with said first ridge and separated from said first ridge by a first annular groove, and a third outwardly facing annular ridge in axial alignment with said second ridge and separated from said second ridge by a second annular groove;

g. an annular retaining piece provided in said second groove; and h. at least one weld connecting said retaining piece to the cylindrical wall of said housing cup for holding said housing cup securely against said adaptor.

20. The actuator of claim 19 wherein the peripheral edge of said diaphragm extends away from said first ridge at a substantially vertical angle when pressurized fluid is delivered to said first chamber.

* * * * *